(12) United States Patent
Park et al.

(10) Patent No.: US 11,680,421 B2
(45) Date of Patent: Jun. 20, 2023

(54) VEHICULAR ROOFTOP TENT

(71) Applicant: IKAMPER CO., LTD., Paju-si (KR)

(72) Inventors: Soon Gyu Park, Paju-si (KR); Jae Hwan Kim, Goyang-si (KR)

(73) Assignee: IKAMPER CO., LTD., Paju-si (KR)

( * ) Notice: Subject to any disclaimer, the term of this patent is extended or adjusted under 35 U.S.C. 154(b) by 0 days.

(21) Appl. No.: 17/214,963

(22) Filed: Mar. 29, 2021

(65) Prior Publication Data

US 2022/0251868 A1 Aug. 11, 2022

Related U.S. Application Data

(63) Continuation of application No. PCT/KR2021/001736, filed on Feb. 9, 2021.

(30) Foreign Application Priority Data

Feb. 9, 2021 (KR) .................. 10-2021-0018295

(51) Int. Cl.
*E04H 15/06* (2006.01)
*B60P 3/38* (2006.01)
*E04H 15/48* (2006.01)

(52) U.S. Cl.
CPC .............. *E04H 15/06* (2013.01); *B60P 3/38* (2013.01); *E04H 15/48* (2013.01)

(58) Field of Classification Search
None
See application file for complete search history.

(56) References Cited

U.S. PATENT DOCUMENTS

| | | | |
|---|---|---|---|
| 3,924,365 A * | 12/1975 | Orberg | B60P 3/38 52/63 |
| 9,580,928 B1 * | 2/2017 | Currid | E04H 15/06 |
| 9,995,055 B1 * | 6/2018 | Currid | E04H 15/64 |
| 10,077,574 B1 * | 9/2018 | Currid | B60R 9/045 |
| 10,465,412 B1 * | 11/2019 | Currid | E04H 15/008 |
| 10,808,416 B2 * | 10/2020 | Park | E04H 15/56 |
| 10,947,753 B2 * | 3/2021 | Currid | B60R 9/045 |
| 11,105,112 B2 * | 8/2021 | Montesalvo | E04H 15/54 |
| 11,193,298 B2 * | 12/2021 | Park | E04H 15/48 |

FOREIGN PATENT DOCUMENTS

| | | | |
|---|---|---|---|
| CN | 114687605 A * | 7/2022 | |
| DE | 202021002174 U1 * | 8/2021 | |
| KR | 102006848 | * | 8/2019 |

* cited by examiner

*Primary Examiner* — David R Dunn
*Assistant Examiner* — Danielle Jackson
(74) *Attorney, Agent, or Firm* — Maier & Maier, PLLC

(57) ABSTRACT

A vehicular rooftop tent according to an embodiment of the present disclosure includes: a first cover part including a first plate member provided in a plate shape; a second cover part including a second plate member provided in a plate shape; a hinge connection part configured to rotatably connect the first cover part and the second cover part; a tent part coupled to the first cover part and the second cover part; and a waterproof part having one end fastened to the first cover part.

7 Claims, 8 Drawing Sheets

VEHICULAR ROOFTOP TENT

CROSS REFERENCE TO PRIOR APPLICATIONS

This application is a Continuation Application of International application PCT/KR2021/001736 filed on Feb. 9, 2021, which claims priority to Korean application 10-2021-0018295 filed on Feb. 9, 2021, the entire contents of each of the above-identified applications are hereby incorporated by reference.

BACKGROUND

The present disclosure relates to a vehicular rooftop tent.

In general, a tent refers to an assembly type movable house that can be disassembled and transported. Nowadays, such a tent is mainly used for temporary camping in military, exploration, mountaineering and camping fields rather than everyday residential use.

The shape, size and material of tents are changed depending on the purpose of use, the place of use, the number of people, the season, etc. The purpose of use and the scale of use of tents are very diverse. Such tents include tents used for military and school camping, large-scale tents used for outdoor music, the theater, the circus, and the like.

In particular, the tents used for leisure activities such as mountaineering, camping, travel and the like have a capacity of about 5 to 10 people and a size that can be carried by a user alone. There are various types of tents for leisure activities, such as a dome type, a triangle type, a roof type, a house type, a single-side slant type, a half-moon type, a dome type, etc.

Although such conventional tents are diverse in size, they are generally bulky, inconvenient to move, difficult to assemble, install and dismantle, and complex in structure, which may cause frequent failures of joints. In particular, when using a leisure tent, a user transports to a camping site mainly by using a vehicle, and then installs and use the prepared tent at the camping site. The tent stored in the vehicle is bulky, which makes it difficult to store a lot of preparations together with the tent. In addition, there is an inconvenience in that the stored tent needs to be taken out from the vehicle and installed.

Furthermore, since a minimum flat ground for spreading and installing the tent has to be secured, there is a limitation in selecting a location for installing the tent.

In order to solve the problems of these conventional tents, a vehicular rooftop tent as disclosed in Patent Document 1 has been proposed. In the rooftop tent according to Patent Document 1, tent fabrics and poles are accommodated in a storage space defined inside a base plate and a cover fixed to a roof of a vehicle. When the rooftop tent is opened by rotating the cover from the base plate, the poles and tent fabrics automatically spread to form a tent. Such a rooftop tent is commonly called a car pension because the rooftop tent can be installed on the roof of the vehicle and used like a mobile home. Such a vehicular rooftop tent is designed to combine leisure and automobile culture and has an advantage that unlike a large trailer or camper, it can be easily installed and used on a vehicle.

However, the conventional vehicular rooftop tent is configured to be covered with a tarpaulin waterproof cover to prevent the tent from getting wet during rainfall. In this case, when the vehicle is traveling, wind may be introduced into the waterproof cover made of fabric or the like and may swell. Thus, the waterproof cover may interfere with the driver's vision, may act as a resistance element during traveling to impair the traveling efficiency, and may have a poor appearance.

SUMMARY

The embodiments of the present disclosure have been conceived to solve the aforementioned problems of the related art and provide a rooftop tent that does not interfere with a driver's vision while traveling, minimizes resistance during traveling, and has a neat appearance.

Furthermore, the embodiments of the present disclosure provide a rooftop tent with an improved waterproof function.

Moreover, the embodiments of the present disclosure provide a rooftop tent capable of allowing a waterproof fabric to be easily attached to and detached from a cover part.

According to one aspect of the present disclosure, there is provided a vehicular rooftop tent, comprising: a first cover part including a first plate member provided in a plate shape; a second cover part including a second plate member provided in a plate shape; a hinge connection part configured to rotatably connect the first cover part and the second cover part; a tent part coupled to the first cover part and the second cover part; and a waterproof part having one end fastened to the first cover part, wherein one of the first cover part and the second cover part is provided so as to be fixedly installed on a roof of a vehicle, the vehicular rooftop tent has a folded mode in which the first cover pail and the second cover part are arranged side by side and the tent part is accommodated in a space between the first cover part and the second cover part and an unfolded mode in which the tent pail is unfolded by rotating one of the first cover part and the second cover part with respect to the other about the hinge connection part, and the waterproof part includes a fastening rod detachably fastened to an edge of the first cover part in the folded mode, a waterproof fabric connected at one end to the fastening rod and configured to close a space between the first cover part and the second cover part, and a tightening module provided at the other end of the waterproof fabric and configured to selectively tighten or loosen the other end of the waterproof fabric.

In the vehicular rooftop tent according to an embodiment of the present disclosure, the tightening module may include a wire accommodation part provided along an edge of the other end of the waterproof fabric, a tension dial part including a wire accommodated in the wire accommodation part and a dial for winding the wire, and a support base coupled to a bottom surface of the tension dial part and provided so as to be attachable to a rear surface of the wire accommodation part.

In the vehicular rooftop tent according to an embodiment of the present disclosure, both ends of the support base may be provided so as to be attachable to one end rear surface and the other end rear surface of the wire accommodation part, respectively.

In the vehicular rooftop tent according to an embodiment of the present disclosure, when the support base is attached to the rear surface of the wire accommodation part, the dial may be exposed to the outside between the other end of the waterproof fabric and both ends of the wire accommodation part.

In the vehicular rooftop tent according to an embodiment of the present disclosure, when the dial is rotated, the wire may be wound around the dial, and when one surface of the dial is pressed, the wire may be unwound from the dial.

In the vehicular rooftop tent according to an embodiment of the present disclosure, the waterproof fabric may be provided to cover at least a portion of a bottom surface of the second cover part in the folded mode.

In the vehicular rooftop tent according to an embodiment of the present disclosure, the first cover part may include a first edge frame provide with a waterproof member fastening passage having a shape in which the fastening rod can be inserted and having a gap formed along a length direction thereof, and the waterproof part may be fastened to the first edge frame as the fastening rod is inserted into the waterproof member fastening passage.

In the vehicular rooftop tent according to an embodiment of the present disclosure, the vehicular rooftop tent may further comprise: a first corner frame configured to cover at least one of corner portions of the first plate member; and a second corner frame configured to cover at least one of corner portions of the second plate member, wherein the first corner frame may include an outer fastening member fastened to a corner portion of the first plate member, and an inner fastening member fastened to the outer fastening member and the first plate member so that at least a portion thereof overlaps with the outer fastening member, and the second corner frame may include a tent outer fastening member fastened to a corner portion of the second plate member so as to make contact with one surface of the second plate member, and a tent inner fastening member fastened to the tent outer fastening member so that at least a portion thereof overlaps with the tent outer fastening member.

According to the embodiments of the present disclosure, it is possible to provide a rooftop tent capable of minimizing resistance during traveling without interfering with a driver's vision while traveling, Furthermore, it is possible to provide a rooftop tent capable of attracting the interest of customers due to the neat appearance thereof.

Moreover, it is possible to provide a rooftop tent capable of minimizing a problem that rainwater flows through between the rooftop tent and the rooftop.

In addition, it is possible to provide a rooftop tent capable of allowing a waterproof fabric to be easily attached to and detached from a cover part.

DETAILED DESCRIPTION

Hereinafter, specific embodiments for implementing the spirit of the present disclosure will be described in detail with reference to the drawings.

In addition, in describing the present disclosure, if it is determined that a detailed description of a related known configuration or function may obscure the subject matter of the present disclosure, the detailed description thereof will be omitted.

In addition, when one component is referred to as being 'connected' to another component, it should be understood that one component may be directly connected to another component and a further component may exist between one component and another component.

The terms used in the subject specification are only used to describe specific embodiments and are not intended to limit the present disclosure. Singular expressions include plural expressions unless the context clearly indicates otherwise.

Hereinafter, a vehicular rooftop tent according to an embodiment of the present disclosure will be described with reference to the drawings.

Figure 1:
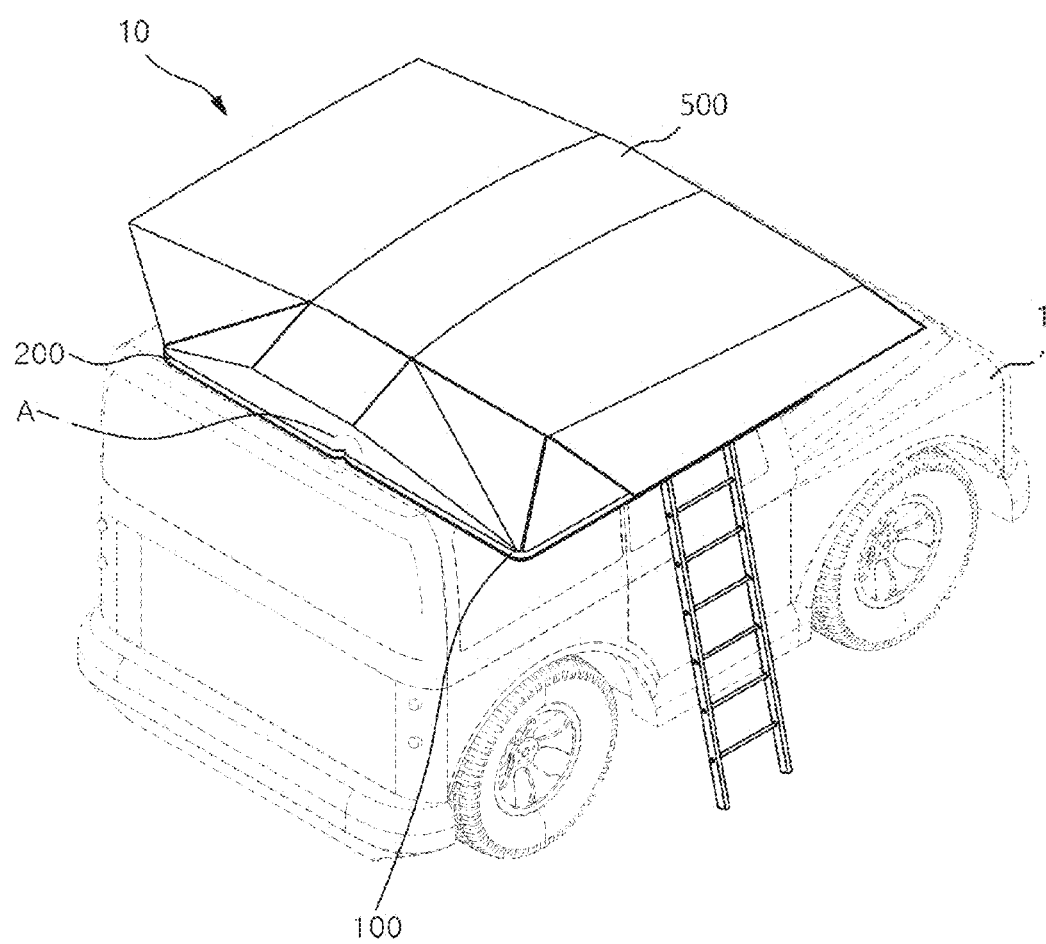
FIG. 1 is a perspective view showing a state in which a rooftop tent according to an embodiment of the present disclosure is installed.

Referring to FIG. 1, a vehicular rooftop tent 10 may be transported by being fixedly installed on a roof of a vehicle 1. In order to use the rooftop tent 10 for residential purposes when arriving at a campsite, the rooftop tent 10 is merely unfolded in a state in which the rooftop tent 10 is mounted on the roof of the vehicle 1, which makes it possible to completely install the rooftop tent 10. The rooftop tent 10 may be installed so that the portion thereof protruding outside the roof of the vehicle 1 can be supported by a member such as a ladder or the like after the installation is completed.

The vehicular rooftop tent 10 includes a first cover part 100, a second cover part 200, a hinge connection part 300, a waterproof part 400 and a tent part 500. Specifically, the first cover part 100 includes a first plate member 110 provided in a plate shape, and the second cover part 200 includes a second plate member 210 provided in a plate shape. The hinge connection part 300 rotatably connects the first cover part 100 and the second cover part 200 to each other. In addition, one end of the waterproof part 400 is fastened to the first cover part 100, and the tent part 500 is connected to the first cover part 100 and the second cover part 200.

According to this configuration, the first cover part 100 is rotationally moved and unfolded about the hinge connection part 300 in a state in which the second cover part 200 is fixedly installed on the roof of the vehicle 1, whereby the tent part 500 accommodated in the first cover part 100 and the second cover part 200 is unfolded so as to have the original shape as a tent as shown in FIG. 1. In other words, the vehicular rooftop tent 10 has a folded mode shown in FIG. 2 in which the first cover part 100 and the second cover part 200 are arranged side by side and the tent part 500 is accommodated in a space between the first cover part 100 and the second cover part 200 and an unfolded mode shown in FIG. 1 in which the tent part 500 is unfolded by rotating the first cover part 100 about the hinge connection part 300 with respect to the second cover part 200.

Figure 2:
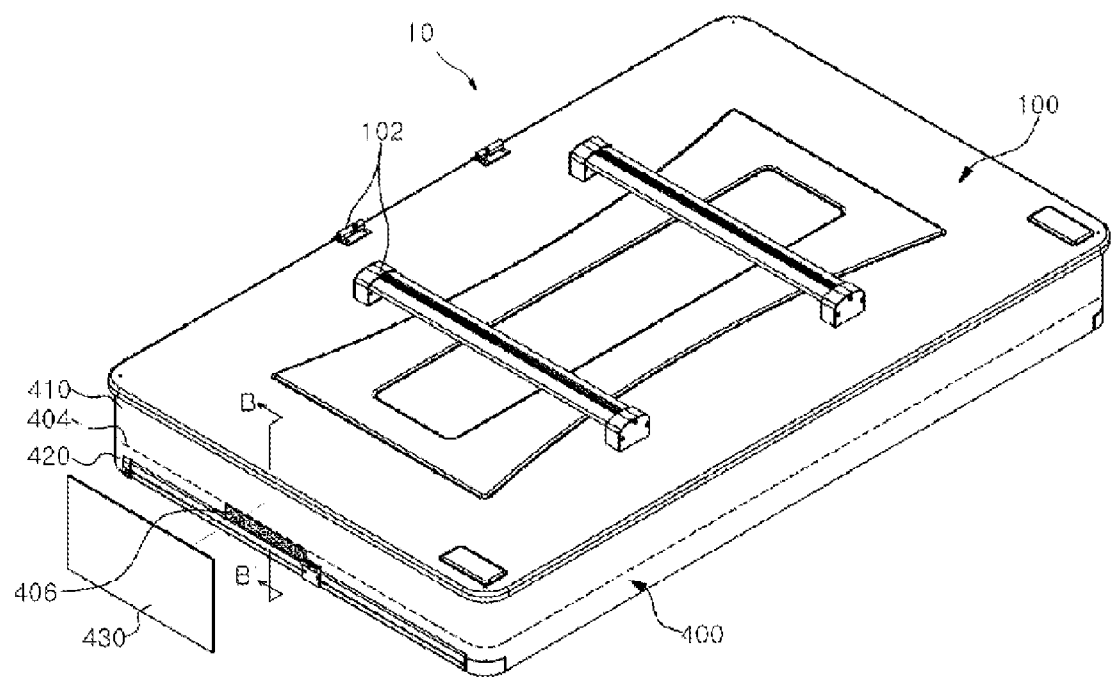
FIG. 2 is a perspective view showing a folded state of the rooftop tent shown in FIG. 1.
Figure 3:
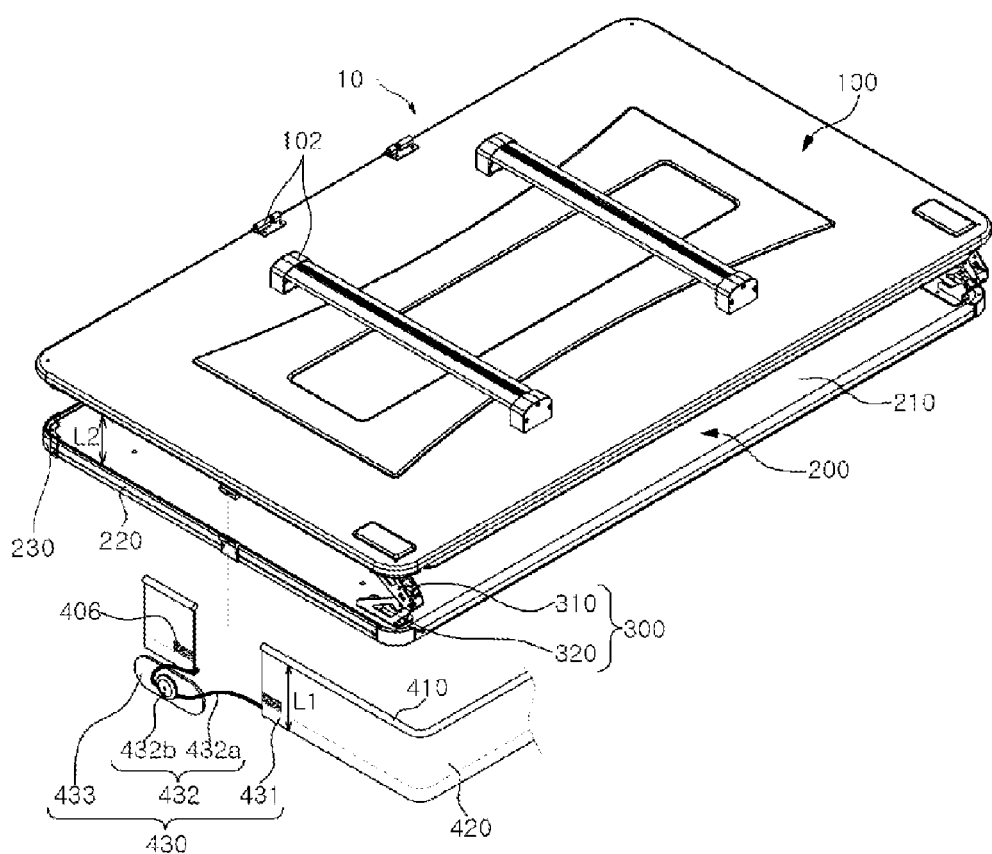
FIG. 3 is an exploded perspective view showing a state in which a waterproof part is separated from the rooftop tent shown in FIG. 2.
Figure 5:
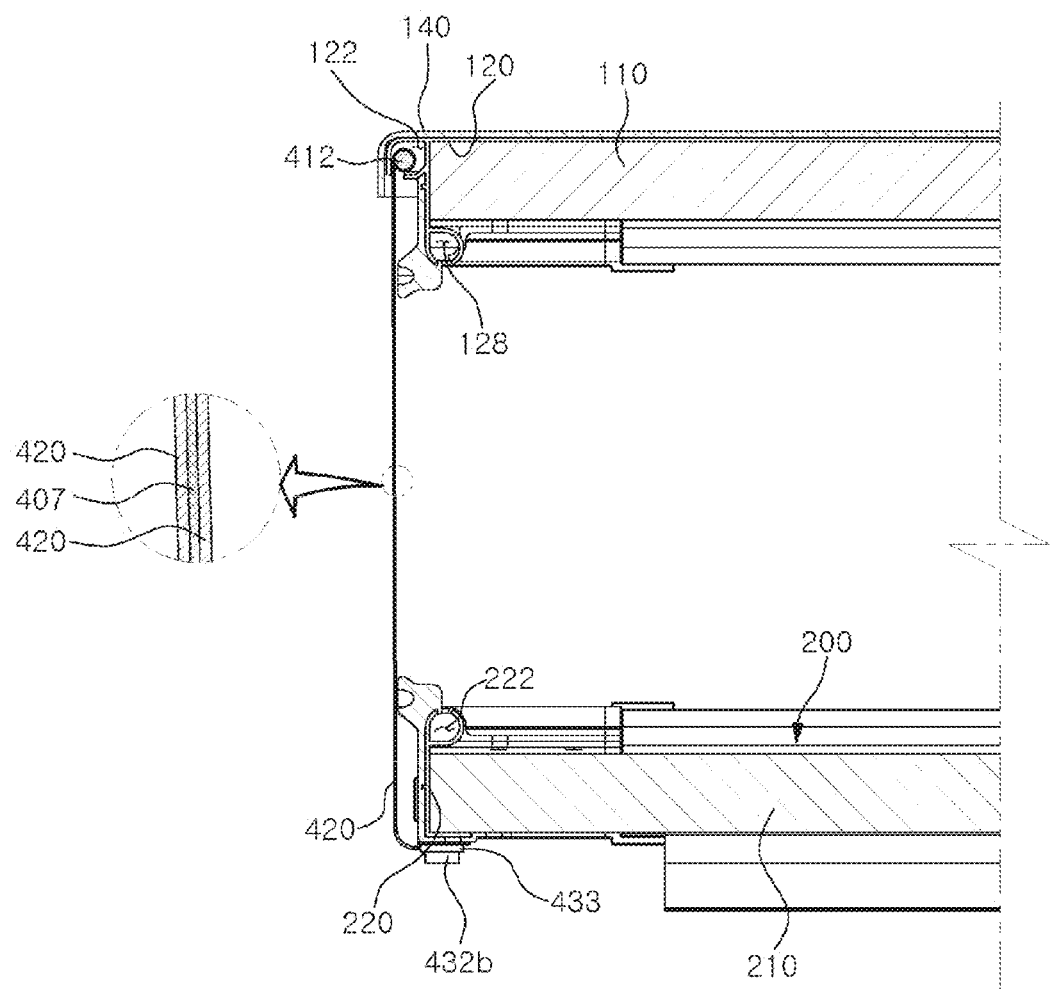
FIG. 5 is a partial sectional view taken along line B-B' of FIG. 2.

Referring to FIG. 2, FIG. 3, and FIG. 5, the first cover part 100 includes a first plate member 110, a first edge frame 120, and an upper cover 140. The first cover part 100 covers one surface of a storage space and includes a first plate member 110 for this purpose. The first plate member 110 may be provided in a simple flat plate shape and may have an outer surface facing the outside and an inner surface. In addition, all four corners of the first plate member 110 may be formed in a round shape. An exterior member 102 composed of a hinge for fastening a ladder and a beam capable of fixing other items may be provided on the outer surface of the first plate member 110.

The first edge frame 120 is a frame installed along four edges of the first plate member 110 and may be made of a light hard material such as aluminum or the like. A waterproof member fastening passage 122 into which a below-shaped fastening rod 410 of the waterproof part 400 to be described later can be inserted is formed on one surface of the first edge frame 120. For example, the waterproof member fastening passage 122 may be formed on the upper outer surface of the first edge frame 120.

The waterproof member fastening passage 122 may include a gap formed on a surface facing the second cover part 200. The gap is formed so that the waterproof member fastening passage 122 can be opened over the entire length of the first edge frame 120. The waterproof part 400 may pass through the gap. In addition, the waterproof member fastening passage 122 may be formed in such a shape as to extend continuously along the circumference of the first edge frame 120 and may be formed in such a shape as to be opened with respect to both ends of the first edge frame 120. Accordingly, the waterproof part 400 may be fastened to the first edge frame 120 along the four corners of the first plate member 110.

A first tent fixing passage 128 is formed on one surface of the first edge frame 120, and the tent part 500 may be fastened and fixed through the first tent fixing passage 128. In this case, the first tent fixing passage 128 may be formed, for example, on the lower inner surface of the first edge frame 120.

Figure 6:
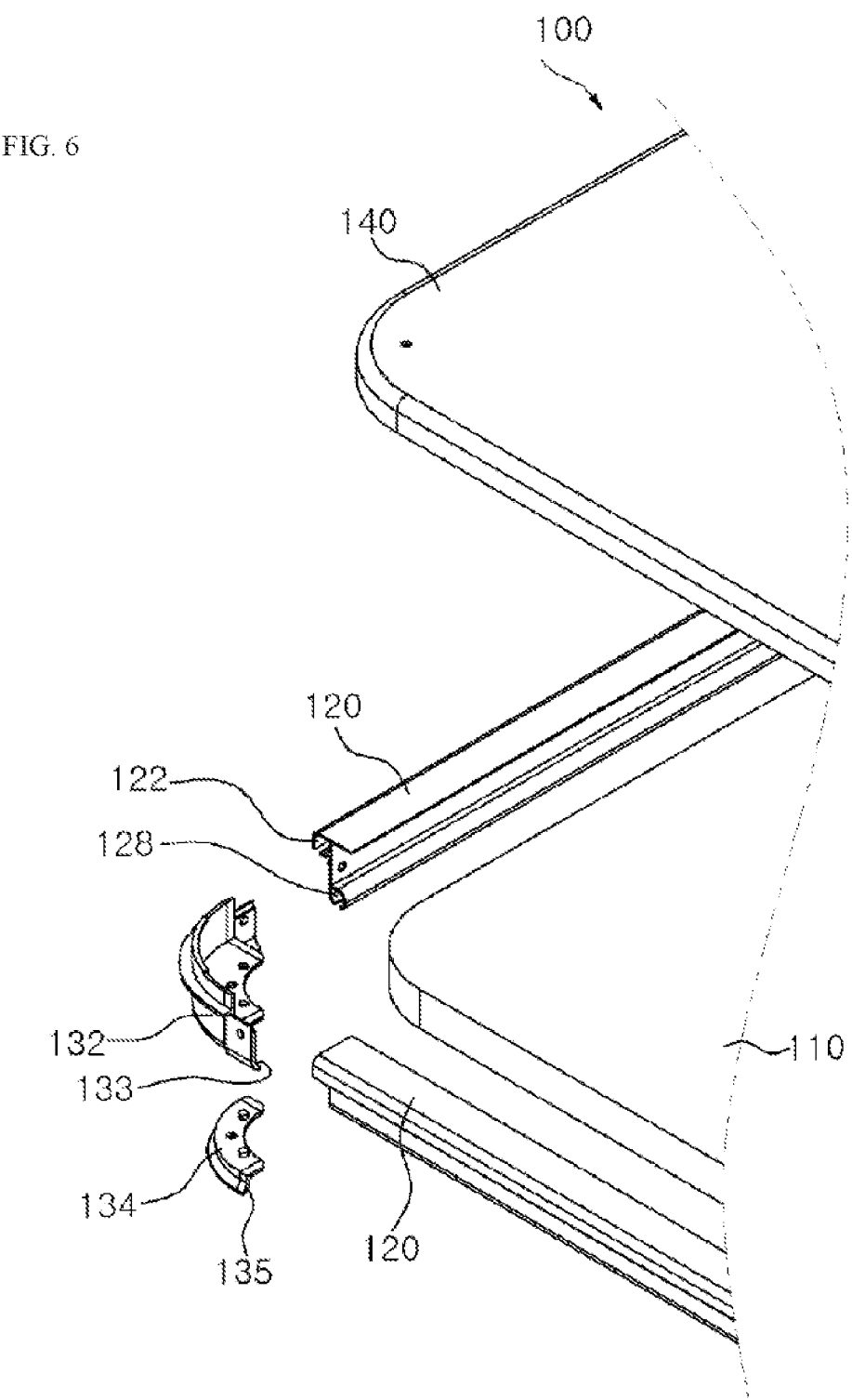
FIG. 6 is an enlarged exploded perspective view showing a first cover part of the rooftop tent shown in FIG. 2.
Figure 7:
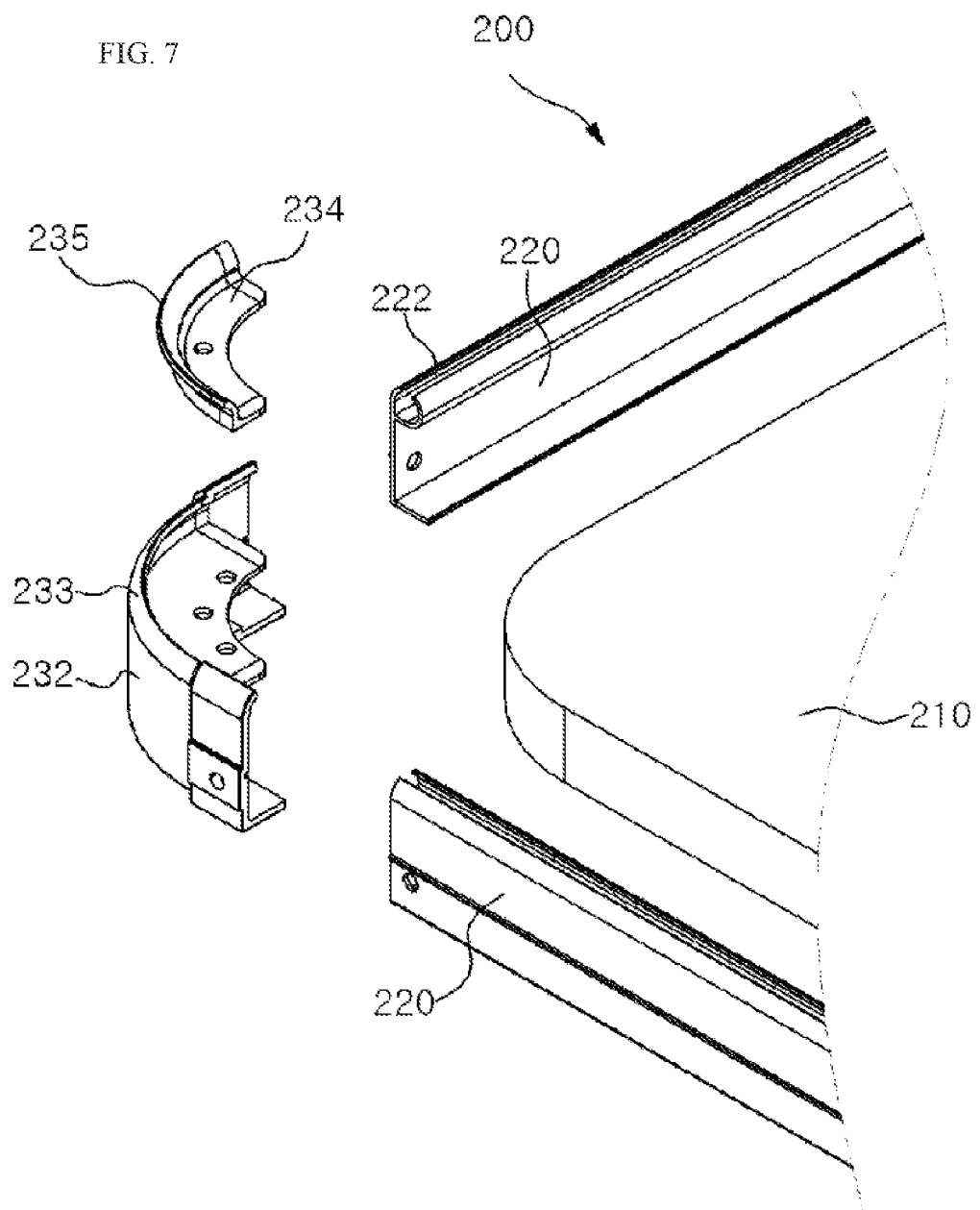
FIG. 7 is an enlarged exploded perspective view showing a second cover part of the rooftop tent shown in FIG. 2.
Figure 8:
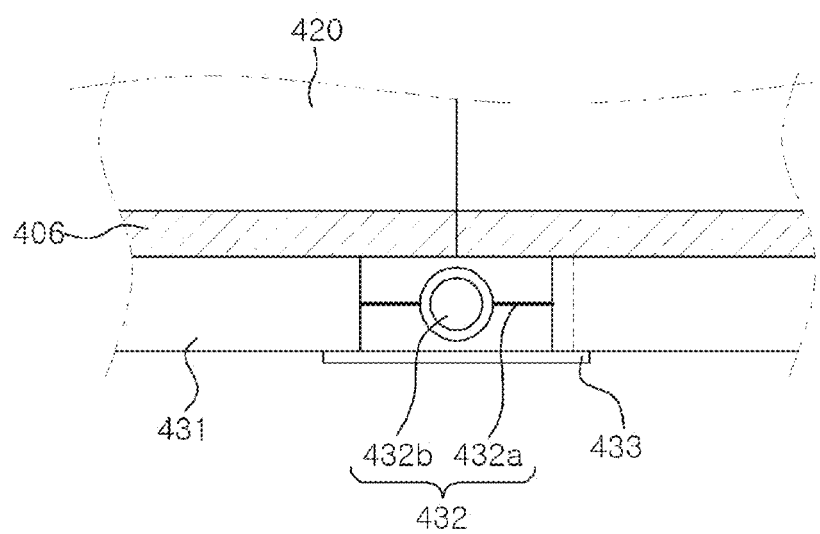
FIG. 8 is a schematic plan view of a tightening module.

Referring back to FIG. 6, the first corner frame may be provided to cover at least one of the corner portions of the first plate member 110, and may be provided at, for example, all edge portions of the first plate member 110. The first corner frame may have a round shape so as to correspond to the corner shape of the first plate member 110.

In addition, an outer fastening member 132 may be fastened to a corner portion of the first plate member 110, and an inner fastening member 134 fastened to the outer fastening member 132 and the first plate member 110 so that at least a portion thereof overlaps with the outer fastening member 132. In other words, the first corner frame may be provided in a form in which two members are assembled.

The outer fastening member 132 may constitute the outermost surface of the first corner frame and may be connected to the first edge frame 120 so as to have a shape in which the first edge frame 120 extends. In addition, the outer fastening member 132 may include an outer lower edge 133 having a shape in which a portion of the first edge frame 120 constituting the first tent fixing passage 128 extends.

The inner fastening member 134 may be partially overlapped with the outer fastening member 132 and may be fastened to the first plate member 110 and the outer fastening member 132. The inner fastening member 134 may include an inner lower edge 135 having a shape in which the remaining shape of the first edge frame 120 constituting the first tent fixing passage 128 extends.

Referring again to FIGS. 2 and 3, the second cover part 200 rotatably connected to the first cover part 100 and configured to constitute a space for accommodation of the tent part 500 together with the first cover part 100. The second cover part 200 includes a second plate member 210, a second edge frame 220 and a second corner frame 230. The second cover part 20 covers the other surface of the storage space for storing the tent part 500 and includes a second plate member 210 for this purpose. The second plate member 210 may be provided in a simple flat plate shape and may have an outer surface facing the outside and an inner surface facing a space in which the tent part 500 is accommodated. In addition, all four corners of the second plate member 210 may be formed in a round shape, and a member (not shown) to be fixedly installed on the roof of the vehicle 1 may be provided on the outer surface of the second plate member 210.

The second edge frame 220 is a frame installed along the four edges of the second plate member 210 and may be made of a light hard material such as aluminum or the like.

In addition, a second tent fixing passage 222 is additionally formed in the second edge frame 220, and the tent part 500 may be fastened and fixed through the second tent fixing passage 222. The second tent fixing passage 222 may be formed at a position facing the first tent fixing passage 128.

The second corner frame 230 is provided to cover at least one of the corner portions of the second plate member 210, and may be provided at, for example, all edge portions of the second plate member 210. The second corner frame 230 may have a round shape so as to correspond to the corner shape of the second plate member 210.

In addition, the second corner frame 230 may include a tent outer fastening member 232 fastened to a corner portion of the second plate member 210 so as to make contact with one surface of the second plate member 210, and a tent inner fastening member 234 fastened to the tent outer fastening member 232 so that at least a portion thereof overlaps with the tent outer fastening member 232.

The tent outer fastening member 232 may constitute the outermost surface of the second corner frame 230 and may be connected to the second edge frame 220 so as to have a shape in which a part of the shape of the second edge frame 220 extends. In addition, the tent outer fastening member 232 may include an outer upper edge 233 having a shape in which a part of the shape of the second edge frame 220 constituting the second tent fixing passage 222 extends.

The tent inner fastening member 234 may be partially overlapped with the tent outer fastening member 232 and may be fastened to the second plate member 210 and the tent outer fastening member 232. The tent inner fastening member 234 may include an inner upper edge 235 having a shape in which the remaining shape of the second edge frame 220 constituting the second tent fixing passage 222 extends.

The configurations of the first cover part 100 and the second cover part 200 as described above may be modified depending on the case. For example, the first cover part 100 may be configured to include the configurations of the second plate member 210, the second edge frame 220 and the second corner frame 230, and the second cover part 200 may be configured to include the configurations of the first plate member 110, the first edge frame 120 and the first corner frame.

Figure 4:
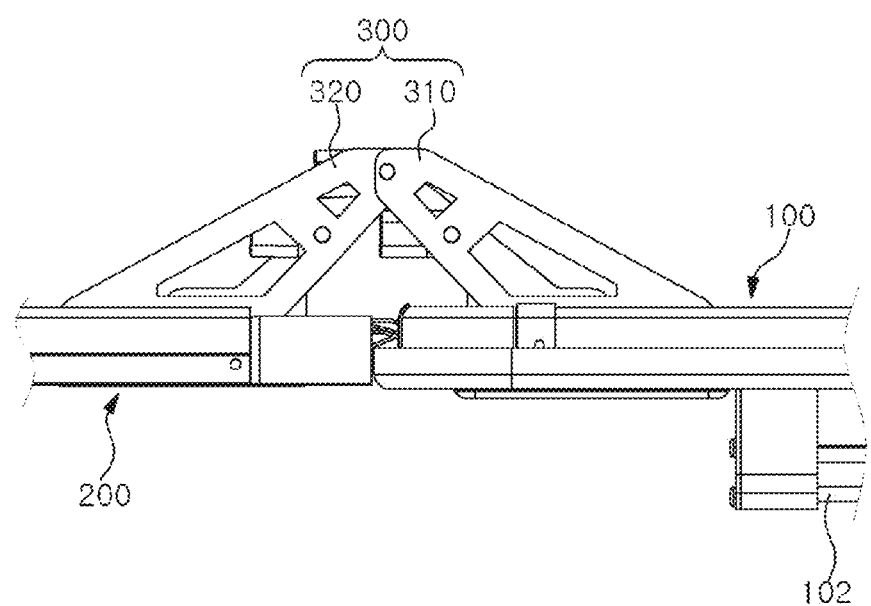
FIG. 4 is an enlarged view of part A in FIG. 1.

Referring to FIG. 4, the hinge connection part 300 includes a first hinge member 310 connected to the first cover part 100 and a second hinge member 320 connected to the second cover part 200. The first hinge member 310 and the second hinge member 320 may be fixed to each other by a pin so as to be pivotable with respect to each other. Accordingly, when the mode of the vehicular rooftop tent 10 is switched, the first cover part 100 may rotate with respect to the second cover part 200 about a connection point between the first hinge member 310 and the second hinge member 320.

Referring to FIG. 5, the waterproof part 400 is provided so that one end thereof can be detachably fastened to the edge of the first cover part 100 in the folded mode state so as to close the space between the first cover part 100 and the second cover part 200. The waterproof part 400 may include a fastening rod 410 detachably fastened to the edge of the first cover part 100 in the folded mode state, a waterproof fabric 420 connected at one end to the fastening rod 410 and configured to close the space between the first cover part 100 and the second cover part 200, and a tightening module 430 provided at the other end of the waterproof fabric 420 and configured to selectively tighten or loosen the other end of the waterproof fabric 420.

The fastening rod 410 may be made of a soft material to have a shape of a round bar, and the waterproof fabric 420 may be provided in a shape extending in one direction from one end while surrounding the fastening rod 410. The waterproof fabric 420 may be made of, for example, tarpaulin.

The waterproof fabric 420 may be provided to seal the space between the first cover part 100 and the second cover part 200. To this end, the length L1 of the waterproof fabric 420 may be set to be larger than the gap L2 between the first cover part 100 and the second cover part 200.

In the waterproof part 400, the fastening rod 410 may be inserted into and received by the waterproof member fastening passage 122 and may be fastened to the first edge frame 120 over the entire edge of the first plate member 110. In addition, when the fastening rod 410 is completely accommodated in the waterproof member fastening passage 122, both ends of the waterproof part 400 may make contact with each other as shown in FIG. 2 to form a joint 404. At this time, in the joint 404, both ends of the waterproof fabric 420 of the waterproof part 400 may be partially overlapped with each other. The overlapped ends may be connected by a detachable material 407.

A joint cover attachment member 406 may be provided at the periphery of the joint 404. Since a joint cover is detachably attached to the joint cover attachment member 406, it is possible to prevent inundation through the joint 404. The joint cover may be made of the same material as the waterproof fabric.

The tightening module 430 for tightening or loosening the other end of the waterproof fabric 420 may be provided at the other end of the waterproof fabric 420.

The tightening module 430 may include, for example, a wire accommodation part 431 provided along the edge of the other end of the waterproof fabric 420, a tension dial part 432 including a wire 432a accommodated in the wire accommodation part 431 and a dial 432b for winding the wire 432a, and a support base 433 coupled to the bottom surface of the tension dial part 432 and provided so as to be attachable to the rear surface of the wire accommodation part 431.

The wire accommodation part 431 may be made of the same material as the waterproof fabric 420 and may be formed to extend from the other end of the waterproof fabric 420. The wire accommodation part 431 may be continuously provided along the entire edge of the other end of the waterproof fabric 420. However, when the length of the waterproof fabric 420 is sufficiently long, it may also be possible to provide the wire accommodation part 431 discontinuously. In other words, when the length of the waterproof fabric 420 is guaranteed so that the other end of the waterproof fabric 420 extends to the bottom surface of the second cover part 200 in a state in which the fastening rod 410 is fastened to the waterproof member fastening passage 122, the wire accommodation part 431 may be provided discontinuously. That is, the wire accommodating part 431 may include at least one section for exposing the wire 432a to the outside.

The tension dial part 432 may be provided to tighten or loosen the wire accommodation part 431 by selectively winding the wire 432a. For example, when the dial 432b of the tension dial part 432 is rotated in one direction, the wire 432a may be wound around the dial 432b. At this time, when the dial 432b is rotated in one direction by adopting an appropriate gear configuration, the wire 432a can be wound around the dial 432b. When the dial 432b is rotated in the other direction, the dial 432b and the wire 432a come into an idle state so that the wire 432a cannot be unwound. In addition, when one surface of the dial 432b is pressed, the idle state of the dial 432b and the wire 432a is released so that the wire 432a can be unwound. The tension dial part 432 may wind or unwind the wire 432 a so that the wire accommodation part 431 can make close contact with the bottom surface of the second cover part 200.

The support base 433 may be provided on one surface of the tension dial part 432. The support base 433 may allow the tension dial part 432 to be stably fixed to the wire accommodation part 431. For example, the support base 433 may be coupled to the bottom surface of the tension dial part 432 so that both ends thereof are exposed to the outside of the tension dial part 432. The portion of the support base 433 exposed to the outside of the tension dial part 432 may be coupled to the rear surface of the wire accommodation part 431. For example, both ends of the support base 433 may be provided so as to be attached to one rear end and the other rear end of the wire accommodation part 431, respectively. In this regard, the support base 433 and the wire accommodation part 431 may be coupled through a separate detachable material.

When the support base 433 is attached to the rear surface of the wire accommodation part 431, the dial 432b of the tension dial part 432 may be exposed to the outside between the other end of the waterproof fabric 420 and both ends of the wire accommodation part 431. Accordingly, the user can rotate or press the dial 432b in a state in which the support base 433 is attached to the wire accommodation part 431.

The waterproof fabric 420 may be provided to extend to the lower portion of the second cover part 200. When the user winds the wire 432a by rotating the dial 432b of the tightening module 430 in a state in which the other end of the waterproof fabric 420 is arranged below the second cover part 200, the wire accommodation part 431 is tightened as the wire 432 a is wound around the dial 432b. Thereafter, the tension dial 432 may be adjusted so that the wire accommodation part 431 makes close contact with the bottom surface of the second cover part 200. As a result, the waterproof fabric 420 may extend to seal the gap between the first cover part 100 and the second cover part 200, and the wire accommodation part 431 constituting the other end of the waterproof fabric 420 may extend to the bottom of the second cover part 200. Therefore, rainwater or the like may be prevented from entering the gap between the first cover part 100 and the second cover part 200 from the outside. As described above, the rooftop tent according to the embodiment of the present disclosure has the effect that the waterproof fabric 420 can be easily fastened to or separated from the cover part by tightening or loosening the other end of the waterproof fabric 420 through the use of the tightening module 430.

Meanwhile, a separate tension ring (not shown) for maintaining the tension of the waterproof fabric 420 in the folded mode state may be provided at the end of the wire accommodation part 431, and a tension protrusion (not shown) to which the tension ring is connected may be provided on the bottom surface of the second cover part 200 at a position corresponding to the position of the tension ring. The tension ring may be provided as an elastic member such as, for example, a rubber band or the like. By connecting the tension ring to the tension protrusion in the folded mode state, the waterproof fabric 420 may be held tightly between the first cover part 100 and the second cover part 200. The shapes of the tension ring and the tension protrusion may be variously changed as long as they correspond to a configuration capable of maintaining the tension of the waterproof fabric 420.

According to the present embodiment having the configuration as described above, when the vehicle travels in a state in which the rooftop tent is fixedly installed on the roof of the vehicle, the tent part may be accommodated in a substantially rectangular box which is defined by the first and second cover parts as two plate members and the waterproof part. Therefore, there is no possibility that the driver's view is obstructed due to the fluttering of the fabric cover during the traveling of the vehicle, and there is an effect of minimizing resistance during the driving of the vehicle. In addition, there is an effect that it is possible to provide a vehicular rooftop tent having a waterproof function and a neat appearance because the tent part is composed of the two rigid plate members and the waterproof part connecting the plate members with a sense of tension.

While the embodiments of the present disclosure have been described above as specific examples, these embodiments are nothing more than examples. The present disclosure is not limited thereto and should be construed as having the widest scope in accordance with the basic idea disclosed herein. Those skilled in the art may combine or substitute the disclosed embodiments to implement a pattern of a shape not indicated herein. This also does not depart from the scope of the present disclosure. In addition, those skilled in the art may easily change or modify the disclosed embodiments based on the subject specification. It is apparent that such changes or modifications also belong to the scope of the present disclosure.

What is claimed is:

1. A vehicular rooftop tent, comprising:
    a first cover part including a first plate member provided in a plate shape;
    a second cover part including a second plate member provided in a plate shape;
    a hinge connection part configured to rotatably connect the first cover part and the second cover part;
    a tent part coupled to the first cover part and the second cover part; and
    a waterproof part having one end fastened to the first cover part, wherein one of the first cover part and the second cover part is configured to be fixedly installed on a roof of a vehicle, the vehicular rooftop tent has a folded mode in which the first cover part and the second cover part are arranged side by side and the tent part is accommodated in a space between the first cover part and the second cover part and an unfolded mode in which the tent part is unfolded by rotating one of the first cover part and the second cover part with respect to the other about the hinge connection part, and the waterproof part includes a fastening rod detachably fastened to an edge of the first cover part in the folded mode, a waterproof fabric connected at one end to the fastening rod and configured to close a space between the first cover part and the second cover part, and a tightening module provided at the other end of the waterproof fabric and configured to selectively tighten or loosen the other end of the waterproof fabric, and the waterproof fabric is configured to cover at least a portion of a bottom surface of the second cover part in the folded mode.

2. The vehicular rooftop tent of claim 1, wherein the tightening module includes a wire accommodation part provided along an edge of the other end of the waterproof fabric, a tension dial part including a wire accommodated in the wire accommodation part and a dial for winding the wire, and a support base coupled to a bottom surface of the tension dial part and configured so as to be attachable to a rear surface of the wire accommodation part.

3. The vehicular rooftop tent of claim 2, wherein one end of the support base is configured to be attached to the rear surface of the wire accommodation part.

4. The vehicular rooftop tent of claim 2, wherein, when the one end of the support base is configured to be attached to the rear surface of the wire accommodation part, the dial is exposed to the outside between the other end of the waterproof fabric and the rear surface of the wire accommodation part.

5. The vehicular rooftop tent of claim 2, wherein when the dial is rotated, the wire is wound around the dial, and when one surface of the dial is pressed, the wire is unwound from the dial.

6. The vehicular rooftop tent of claim 1, wherein the first cover part includes a first edge frame provided with a waterproof member fastening passage having a shape in which the fastening rod can be inserted and having a gap formed along a length direction thereof, and the waterproof part is fastened to the first edge frame as the fastening rod is inserted into the waterproof member fastening passage.

7. The vehicular rooftop tent of claim 1, further comprising:
    a first corner frame configured to cover at least one of corner portions of the first plate member; and
    a second corner frame configured to cover at least one corner portion of the second plate member, wherein the first corner frame includes an outer fastening member fastened to a corner portion of the first plate member, and an inner fastening member fastened to the outer fastening member and the first plate member so that at least a portion thereof overlaps with the outer fastening member, and the second corner frame includes a tent outer fastening member fastened to a corner portion of the second plate member so as to make contact with one surface of the second plate member, and a tent inner fastening member fastened to the tent outer fastening member so that at least a portion thereof overlaps with the tent outer fastening member.

* * * * *